US006891581B2

(12) United States Patent
Peng

(10) Patent No.: US 6,891,581 B2
(45) Date of Patent: May 10, 2005

(54) ASSEMBLY STRUCTURE FOR ALUMINUM FRAME OF LIQUID CRYSTAL DISPLAY

(76) Inventor: Ching-Lung Peng, 1460 Chung Cheng West Road, Chu Pei City, Hsinchu Hsien (TW)

( * ) Notice: Subject to any disclaimer, the term of this patent is extended or adjusted under 35 U.S.C. 154(b) by 82 days.

(21) Appl. No.: 10/455,377

(22) Filed: Jun. 6, 2003

(65) Prior Publication Data

US 2004/0246396 A1 Dec. 9, 2004

(51) Int. Cl.[7] ............................................. G02F 1/1333
(52) U.S. Cl. ......................................... 349/58; 361/723
(58) Field of Search .................. 349/58, 187; 361/723, 361/724, 730, 732, 535

(56) References Cited

U.S. PATENT DOCUMENTS

| 4,231,098 | A | * | 10/1980 | Tanimoto | ..................... 361/680 |
| 5,450,285 | A | * | 9/1995 | Schlemmer | ................. 361/724 |
| 5,751,544 | A | * | 5/1998 | Song | .......................... 361/681 |
| 6,317,314 | B1 | * | 11/2001 | Kung et al. | ................. 361/680 |
| 6,466,283 | B1 | * | 10/2002 | Peng | ............................ 349/58 |

* cited by examiner

Primary Examiner—Tarifur R. Chowdhury
Assistant Examiner—David Chung
(74) Attorney, Agent, or Firm—Troxell Law Office PLLC

(57) ABSTRACT

An assembly structure for aluminum frame of LCD, comprising a front frame, a middle frame and a rear frame. These frames are composed of two sets of long rectangular horizontally matching frames and two sets of short rectangular vertically matching frames. The front frame has a rectangular loop of sticking spline at inner edge. The middle frame forms a horizontally inward rectangular loop of embedded lug at connection with front frame, and forms a vertically upward rectangular loop of locking lug at connection with rear frame. The sticking spline of front frame leans against the embedded lug of middle frame. The fastener of sticking spline is used to clamp and position the front and middle frame. The periphery of rear frame leans against the locking lug of middle frame. Locking and positioning the middle and rear frames by a screw. With above, the aluminum frame of LCD is accomplished.

6 Claims, 9 Drawing Sheets

ASSEMBLY STRUCTURE FOR ALUMINUM FRAME OF LIQUID CRYSTAL DISPLAY

FILED OF THE INVENTION

The present invention is related to aluminum frame for liquid crystal display (LCD). Especially, it means a LCD aluminum frame that has a simple assembly structure, a smooth and beautiful surface and a reduction of radiation.

BACKGROUND OF THE INVENTION

Presently, the frame surrounding the LCD is directly made of injection molded resin. Although the material cost is low, the recycle of resin material causes release of toxic substances. If direct landfill is used instead of recycle, it fails to provide effective degradation. The resin material does not meet current environmental requirements and may create many environmental problems in the future. Many countries have put strict regulations on the use of plastics. The resin material for the frame for LCD is an urgent problem for the industry to solve now.

To achieve electromagnetic interference (EMI) requirement for resin frame, a metal plate is put inside the frame to prevent electromagnetic wave and reduce radiation. Such metal plate usually is made of iron and heavy. With the resin frame, the total weight will be very heavy. The entire industry is eager to Minimize the overall weight and meet the environmental requirement. This goal is to make computer peripherals lightweight and environment-friendly, and competitive in the market.

Therefore, the industry adopted aluminum as LCD frame material. Usually casting or extrusion is adopted for aluminum processing. With consideration of manufacturing cost, the die and mold for forging process is expensive and unable to form vertically sticking rib to isolate electromagnetic wave by a one-time process. The reason is the vertically sticking rib affects the mold release. Thus, current method adopts inexpensive extrusion with low dic and mold cost. As a result, the production can provide economic benefits.

For extruded aluminum as LCD frame, electric arc welding can be only used for the middle frames, but not for the front frame. This is because black shadow or black spot is found during anode processing and it affects the aesthetic feeling for the LCD panel. So present assembly of the front frame and the middle frame made of extruded aluminum has technical bottleneck that is harmful to competitiveness and disadvantageous to sales. This is an urgent problem that the industry needs to solve now.

SUMMARY OF THE INVENTION

The inventor realized the needs in the LCD industry and was dedicated to R&D. with many years of experiences in the industry, the inventor invented an assembly structure for aluminum frame for LCD, so the industry can benefit from the invention.

The main objective for the present invention is to provide an assembly structure for aluminum frame for LCD. The frame is made of extruded aluminum. It is lightweight and environment friendly. The frame also serves as electromagnetic wave shield for LCD panel to provide low radiation.

Another objective for the present invention is to provide an assembly structure for aluminum frame for LCD that the front frame and the middle frame are connected and positioned by fasteners to solve the practical welding problem with the front frame surface. Such assembled aluminum frame has a simple structure, smooth surface and aesthetic appearance. All these advantages help sales and improve product competitiveness.

DETAILED DESCRIPTION OF THE INVENTION

Figure 1:
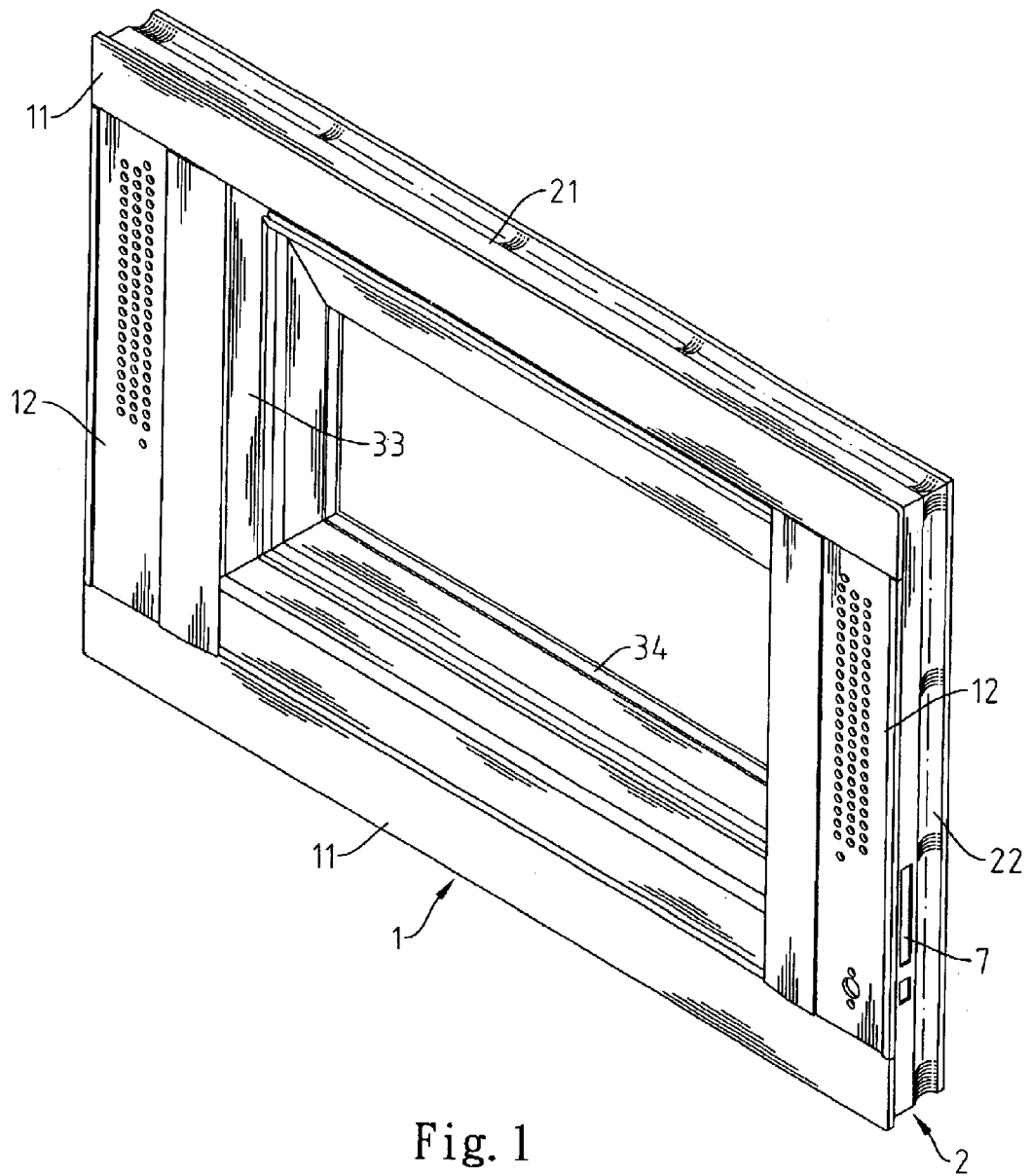
FIG. 1 is an illustration for the appearance of the assembly structure for the aluminum frame for liquid crystal display in the present invention.
Figure 9:
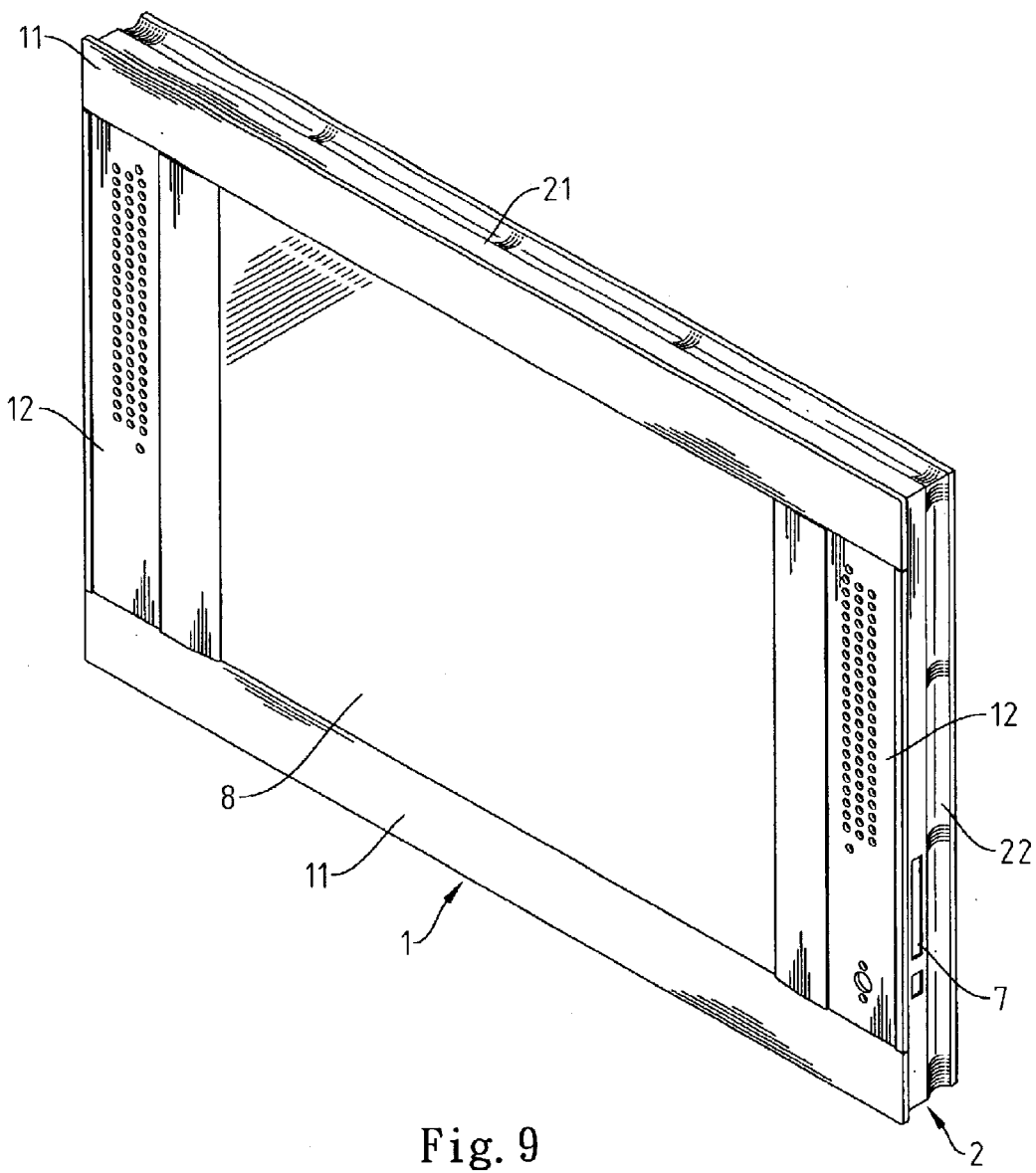
FIG. 9 is an embodiment for the assembly structure for the aluminum frame for the liquid crystal display in the present invention.

Please refer to FIG. 1 and FIG. 9. The aluminum LCD frame assembly is mainly composed of a front frame 1, a middle frame 2 and a rear frame 3.

Figure 2:
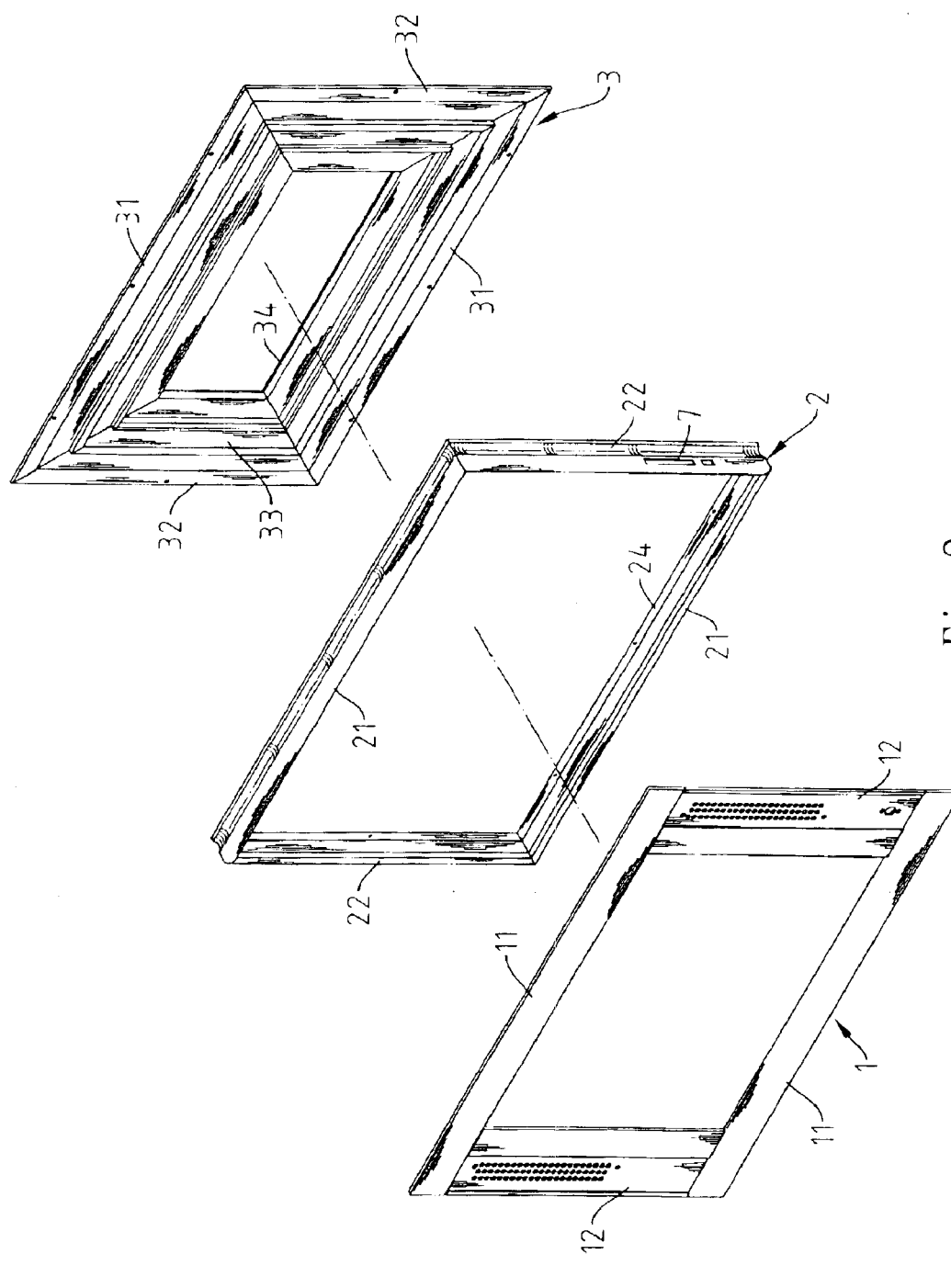
FIG. 2 is an illustration for the components for the assembly structure for the aluminum frame for liquid crystal display in the present invention.
Figure 3:
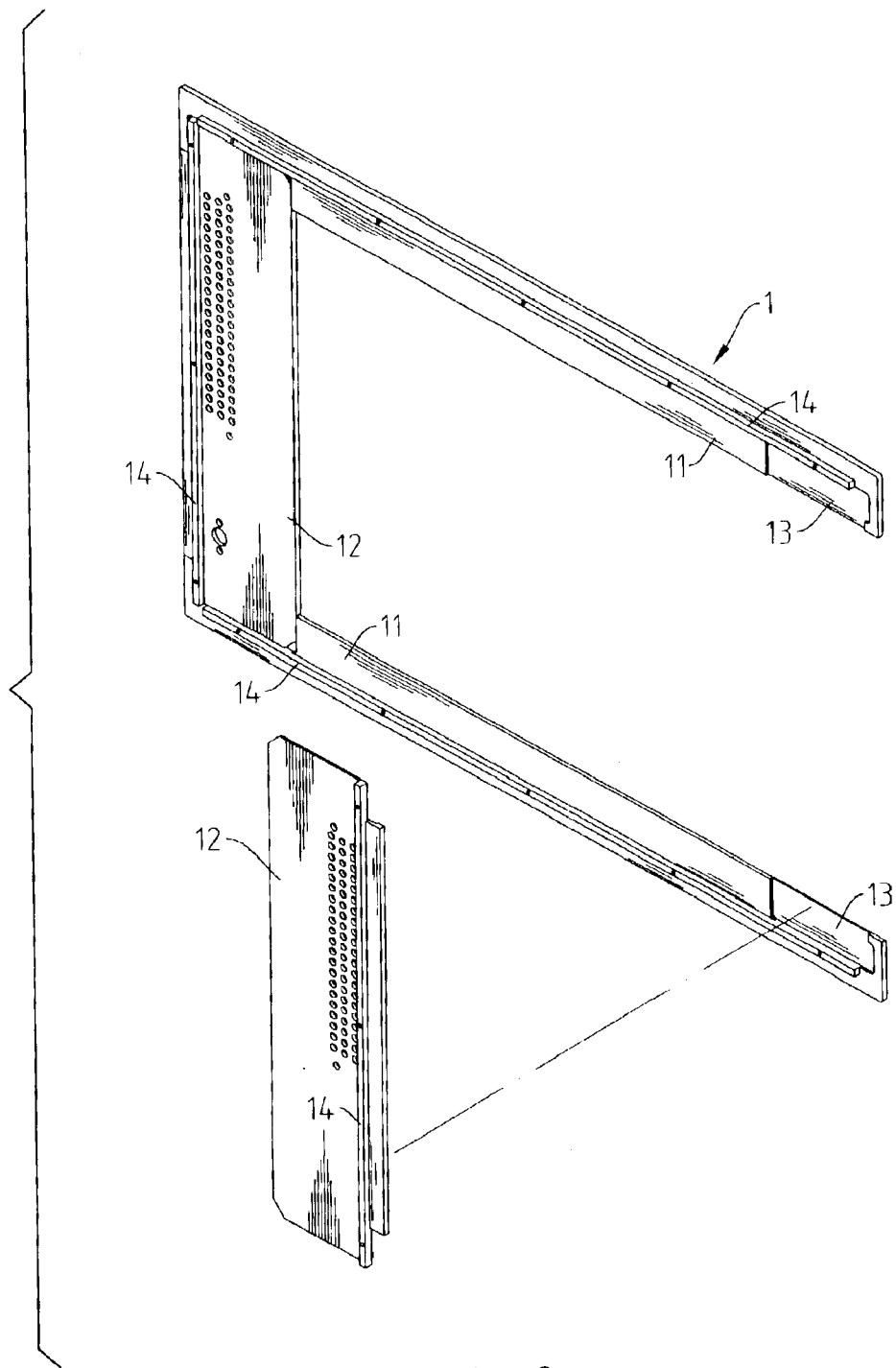
FIG. 3 is an illustration for the assembly for the front frame display in the present invention.
Figure 4:
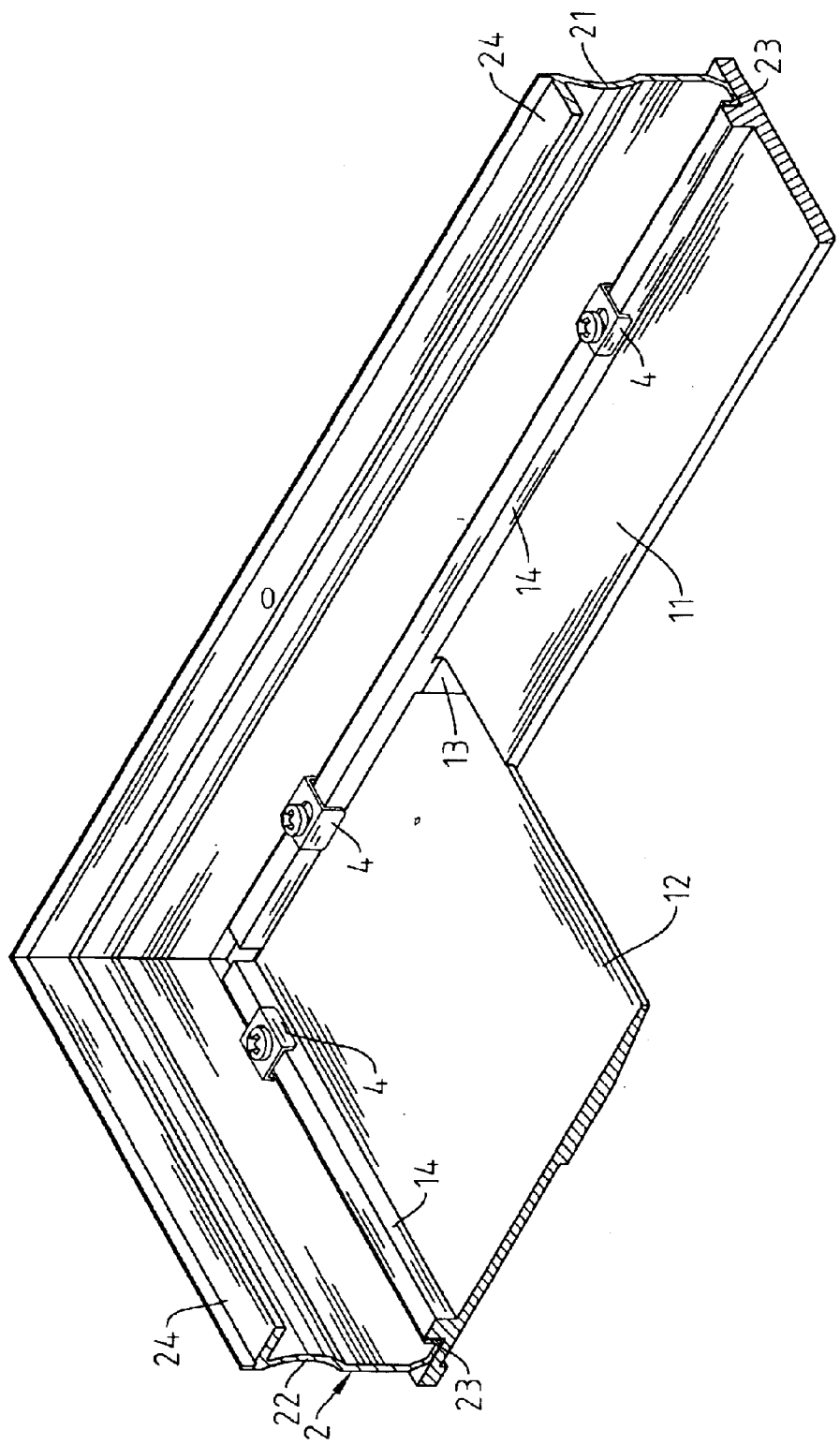
FIG. 4 is an illustration for the assembly status for the short front frame plate of the front frame.

As shown in FIG. 3, the front frame 1 comprises two sets of long frame boards 11 and two sets of short frame boards 12. The long frame boards 11 are horizontally parallel and fit the short frame boards 12. The short frame boards 12 arc vertically parallel and fit the long frame boards 11. At the connection of the long frame board 11 with the short frame board 12, there are cavities 13 where the two ends of the short frame board 12 are placed. Thus, the front frame 1 composed of two sets of long frame boards 11 and two sets of short frame boards 12 can keep an aesthetic appearance (as shown in FIG. 1 and FIG. 2). The front frame 1 has a sticking spline frame 14 in rectangular shape at inner edge that accommodates a ⊓shape fastener 4. The fastener 4 can be buried inside the two ends of the short frame boards 12 at the cavities 13 of the long frame boards 11 (as shown in FIG. 4). Thus, the two sets of short frame boards are secured with the two sets of long frame boards 11.

The middle frame assembly 2 comprises two sets of long frame boards 21 and two sets of short frame boards 22. The long frame boards 21 are horizontally parallel and fit the short frame boards 22. The short frame boards 22 are vertically parallel and fit the long frame boards 21. The connection of the two sets of long frame boards 21 and the two sets of short frame boards 22 is made by electric arc welding to form a middle frame 2 that can accommodate a LCD panel 8. At the connection with the front frame, the long frame boards 21 and the short frame boards 22 have inward extending embedded lug 23. At the connection with the rear frame, the long frame boards 21 and the short frame boards 22 have upward extending locking lug 24.

The middle frame assembly 3 comprises two sets of long frame boards 31 and 25 two sets of short frame boards 32.

Figure 5:
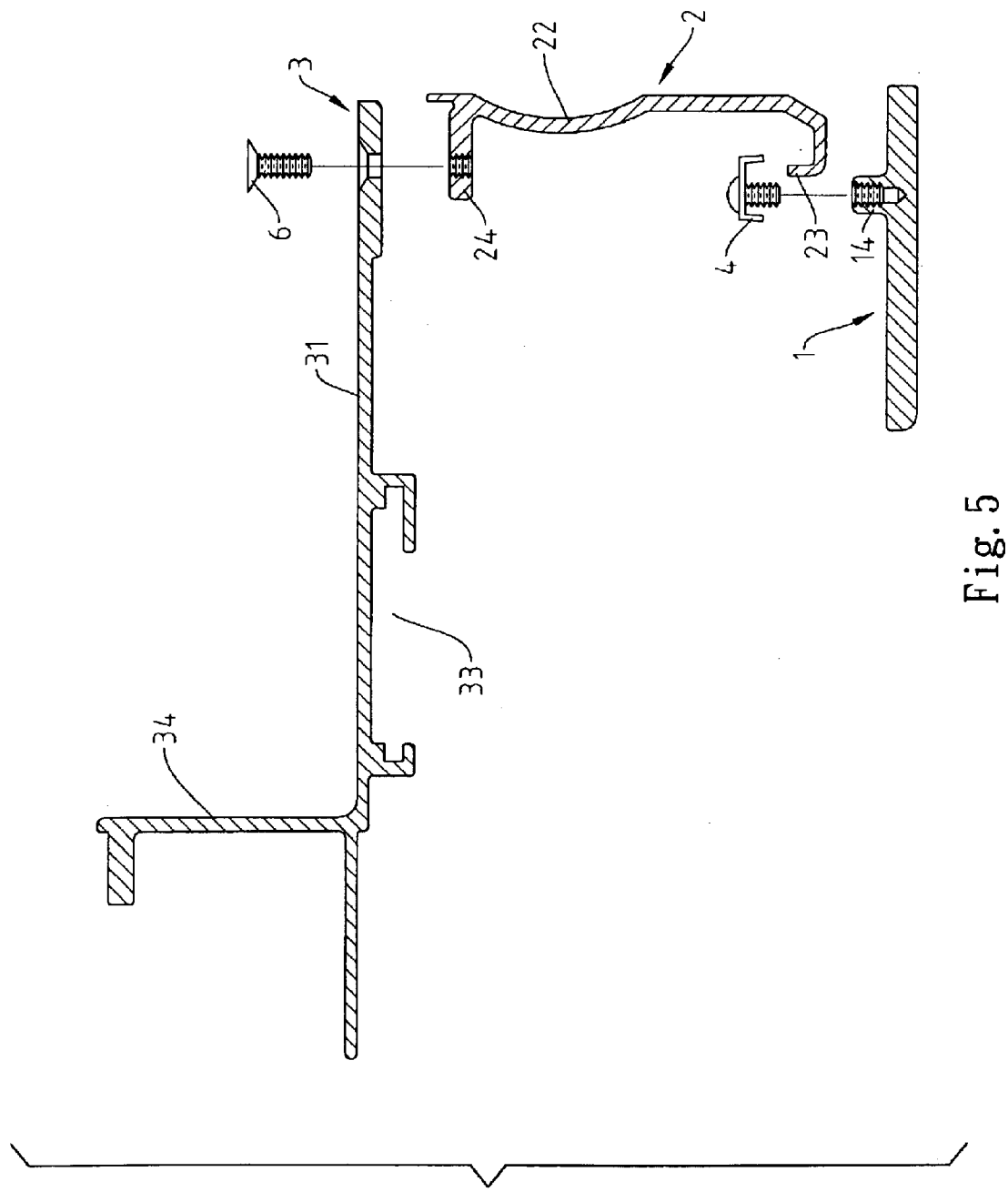
FIG. 5 is a cross-sectional view for the front frame, the middle frame and the rear frame.
Figure 6:
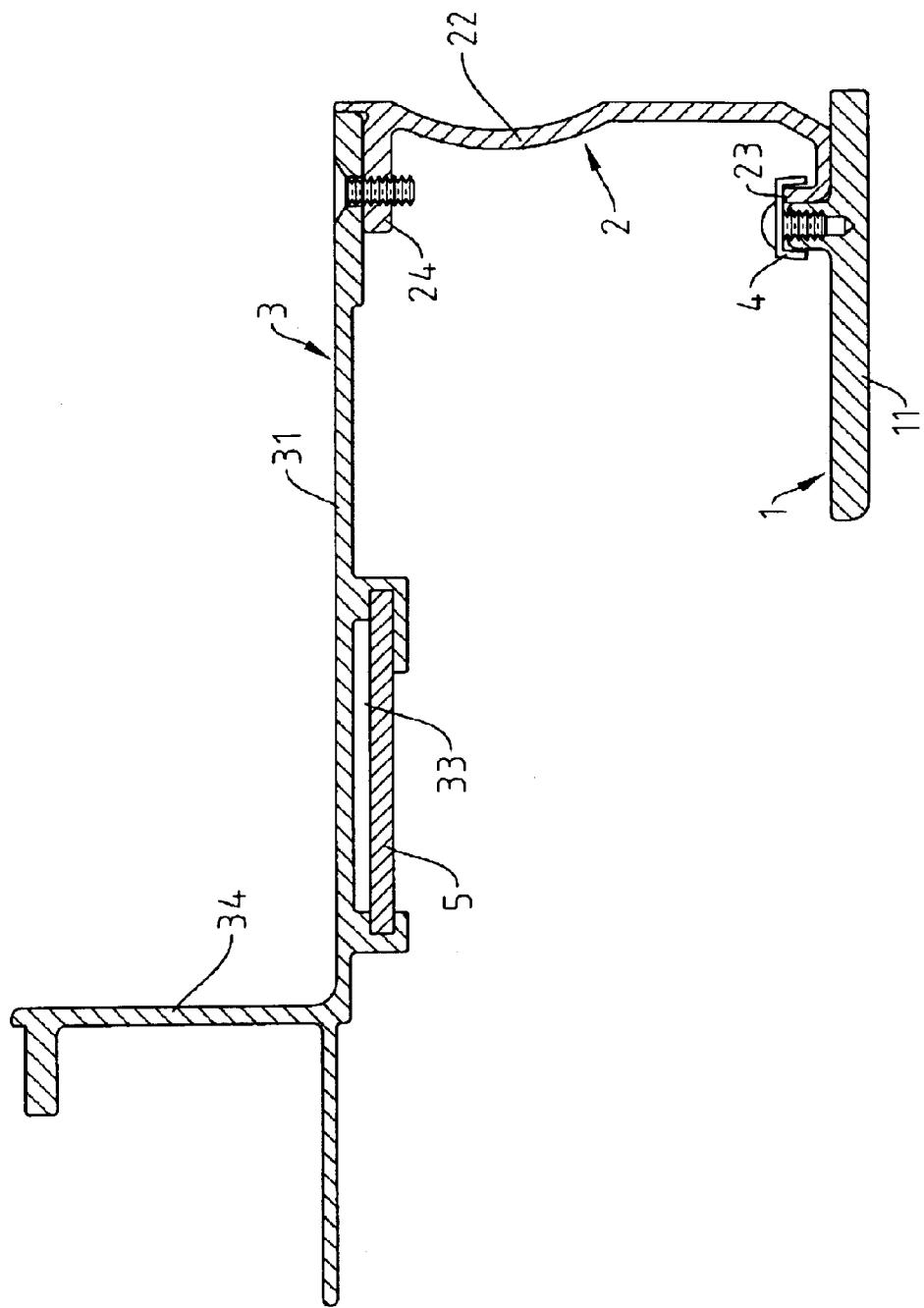
FIG. 6 is a cross-sectional view for the assembly of the front, the middle and the rear frames.
Figure 7:
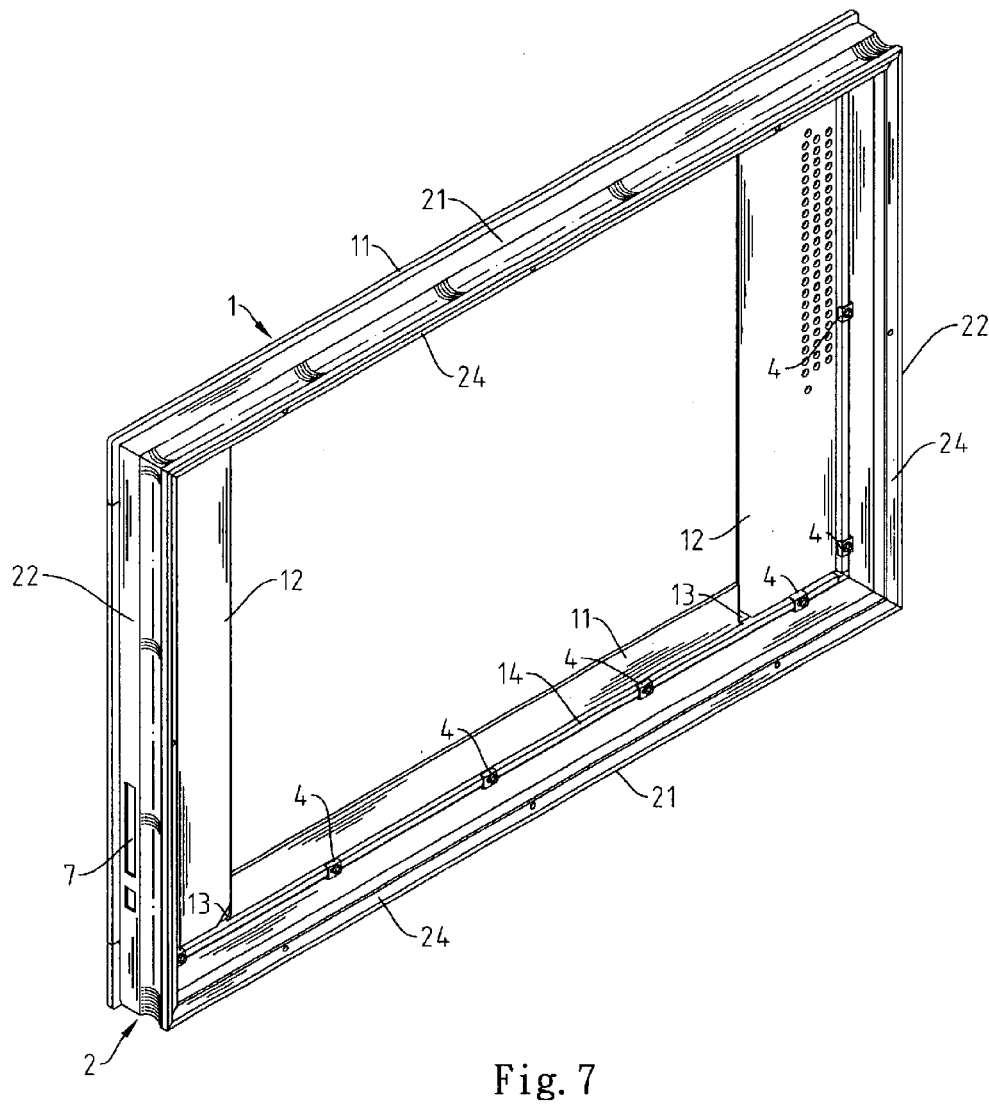
FIG. 7 is a three-dimensional view for the assembly of the front and the middle frames.
Figure 8:
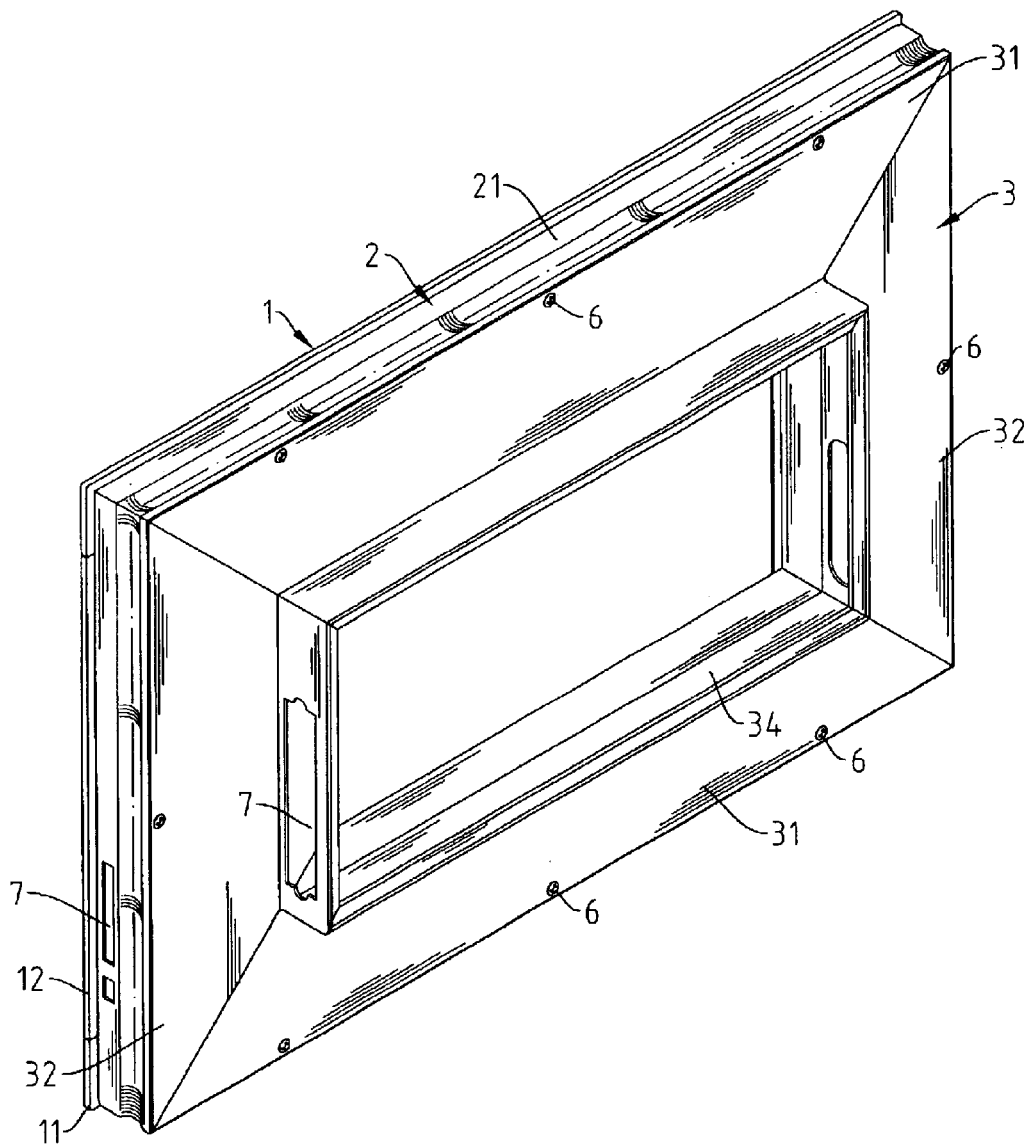
FIG. 8 is a three-dimensional view for the assembly of the front, the middle and the rear frames.

The long frame boards 31 are horizontally parallel and fit the short frame boards 32. The short frame boards 32 are vertically parallel and fit the long frame boards 31. The connection of the two sets of long frame boards 31 and the two sets of short frame boards 32 is made by electric arc welding to form a middle frame 3 that has a rectangular groove 33 for inserted board (as shown in FIG. 5). The groove 33 is for sliding the locking plate 5 for the LCD panel 7 (as shown in FIG. 6). At the outer side of the rear frame 3, there is a receptacle frame 34 to accommodate driver IC board (as shown in FIG. 8).

From FIG. 5 to FIG. 8, the procedures for assembly of the front frame 1, the middle frame 2 and the rear frame 3 include: the sticking spline 14 of the front frame 1 leans against the embedded lug 23 of the middle frame 2; the fastener 4 on the spline 14 is used to clamp the spline 14 and the embedded lug 23; the front frame 1 and the middle frame 2 arc thus assembled; the rear frame 3 peripheral leans against the locking lug 24 of the middle frame 2; a screw 6 is used to tighten the middle frame 2 and the rear frame 3; the entire LCD aluminum frame is assembled.

Besides, the LCD aluminum frame can be further made opening grooves 8 at one side of the middle frame 2 and one side of the receptacle frame 34 for the rear frame 3, so connection can be made for external terminals.

From the above description, for the embodiment in FIG. 9, the LCD panel 8 can be secured inside the aluminum frame composed of the front frame 1, the middle frame 2 and the rear frame 3. The aluminum frame also serves as electromagnetic wave shield for LCD panel to provide low radiation. The product is lightweight and meets environmental requirement for recycle. Again, the front frame 1 and the middle frame 2 are assembled and positioned by fasteners 4 to solve the welding problem with previous assembly method. Such assembly of aluminum frame has a simple structure. The front frame 1 has a smooth surface and an aesthetic feeling, which help sales and product competitiveness.

What is claimed is:

1. An assembly structure for aluminum frame of liquid crystal display (LCD), mainly comprising a front frame, a middle frame and a rear frame; these frames are composed of two sets of horizontally parallel long frame boards and two sets of vertically parallel short frame boards, characterized in that:

said front frame has a rectangular loop of sticking spline at inner edge; said middle frame forms a horizontally inward rectangular loop of embedded lug at connection with said front frame; said middle frame also forms a vertically upward rectangular loop of locking lug at connection with the rear frame;

said sticking spline of said front frame leans against said embedded lug of said middle frame; a fastener on said sticking spline is used to clamp and position said front and said middle frame; a periphery of said rear frame leans against said locking lug of said middle frame; a screw is used to lock and position said middle and said rear frame; through the above described assembly mechanism, said aluminum frame of liquid crystal display is accomplished.

2. The assembly structure for aluminum frame of liquid crystal display (LCD) of claim 1, wherein a connection of said long frame board with said short frame board, there is a cavity where the two ends of said short frame boards are placed; thus, said front frame can keep an aesthetic appearance.

3. The assembly structure for aluminum frame of liquid crystal display (LCD) of claim 1, wherein a rectangular groove is available in said rear frame for LCD panel to slide a locking and positioning plate.

4. The assembly structure for aluminum frame of liquid crystal display (LCD) of claim 1, wherein a receptacle groove is available in said rear frame for accommodating a driver IC board.

5. The assembly structure for aluminum frame of liquid crystal display (LCD) of claim 1, wherein said fastener for said spline of said front frame is in ⊓ shape.

6. The assembly structure for aluminum frame of liquid crystal display (LCD) of claim 1, wherein an opening groove can be made at one side of said middle frame and one side of said receptacle groove of said rear frame for connection of external terminals.

* * * * *